No. 649,807. Patented May 15, 1900.
T. BYRD.
RUNNING GEAR FOR VEHICLES.
(Application filed Nov. 23, 1899.)
(No Model.) 2 Sheets—Sheet 1.
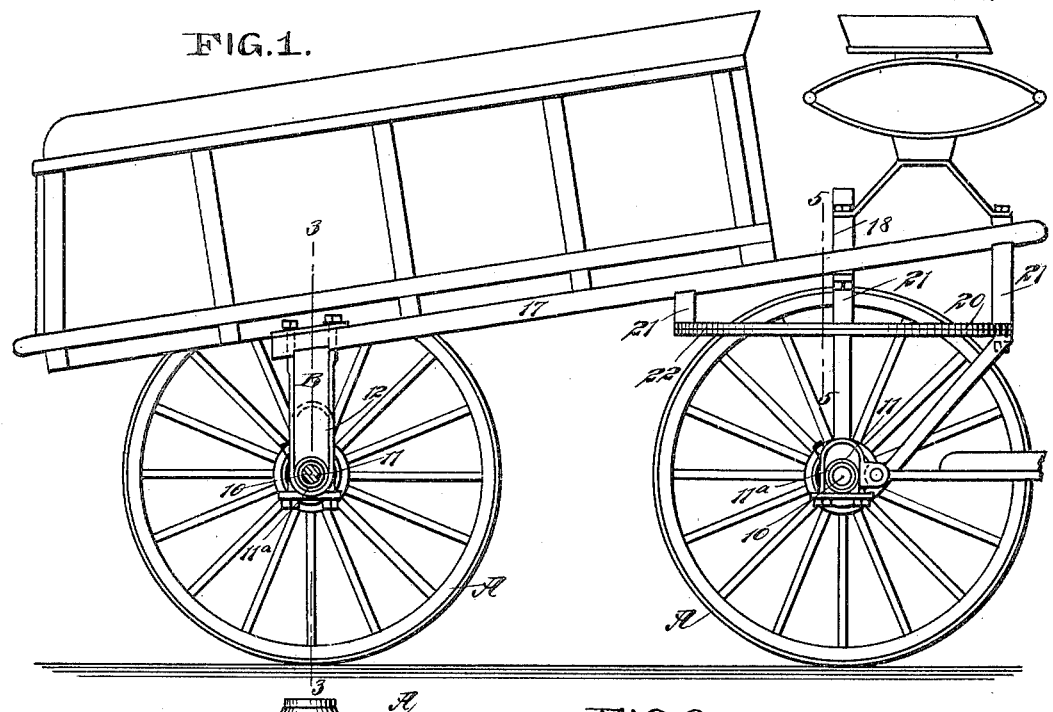
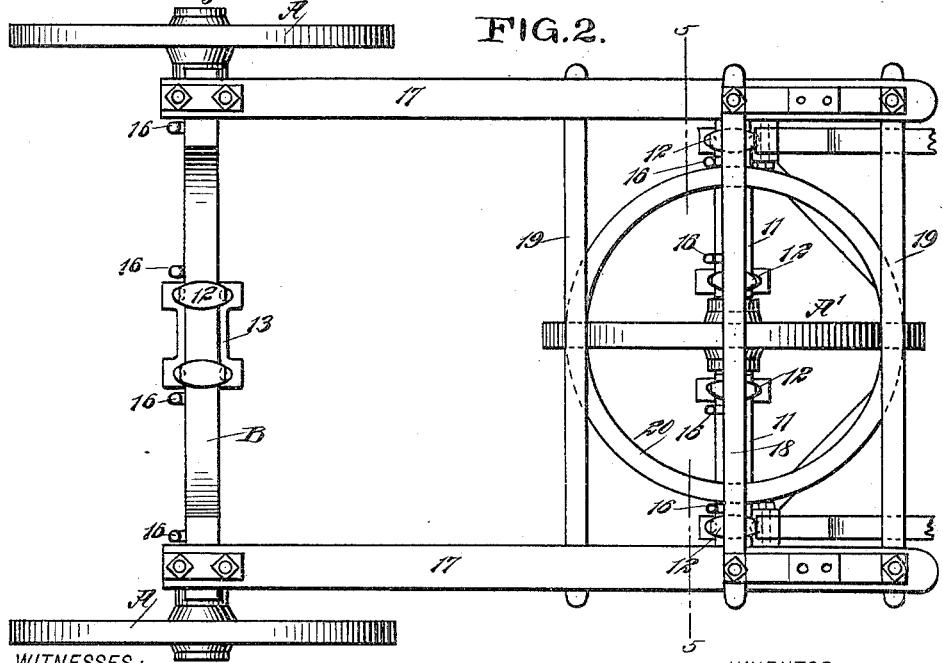
WITNESSES:
INVENTOR
Turner Byrd
BY
ATTORNEYS
THE NORRIS PETERS CO., PHOTO-LITHO., WASHINGTON, D. C.

No. 649,807. Patented May 15, 1900.
T. BYRD.
RUNNING GEAR FOR VEHICLES.
(Application filed Nov. 23, 1899.)

(No Model.) 2 Sheets—Sheet 2.

WITNESSES:

INVENTOR
Turner Byrd
BY
ATTORNEYS

UNITED STATES PATENT OFFICE.

TURNER BYRD, OF ST. LOUIS, MISSOURI.

RUNNING-GEAR FOR VEHICLES.

SPECIFICATION forming part of Letters Patent No. 649,807, dated May 15, 1900.

Application filed November 23, 1899. Serial No. 738,042. (No model.)

*To all whom it may concern:*

Be it known that I, TURNER BYRD, a citizen of the United States, and a resident of the city of St. Louis, in the State of Missouri, have invented a new and Improved Running-Gear for Vehicles, of which the following is a full, clear, and exact description.

One object of my invention is to so construct the axles of a vehicle that the ground-wheels may be firmly secured thereto and so that the axles when connected with their beds will have extended bearings and may turn with but little friction.

A further object of the invention is to so construct the front and rear axles that they will be in independent sections having independent bearings and be adapted to axles of two, three, or four wheeled vehicles, as required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
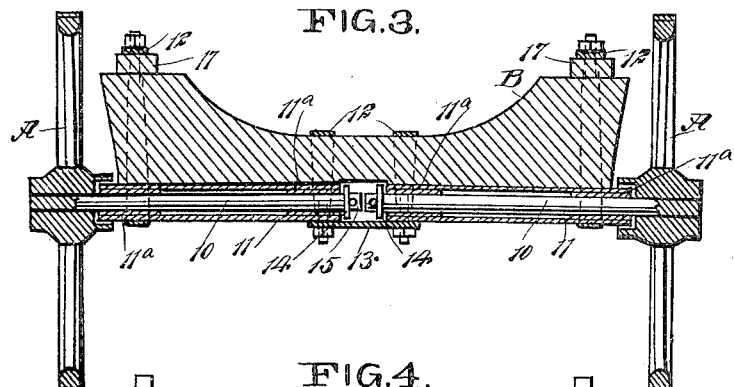
Figure 4:
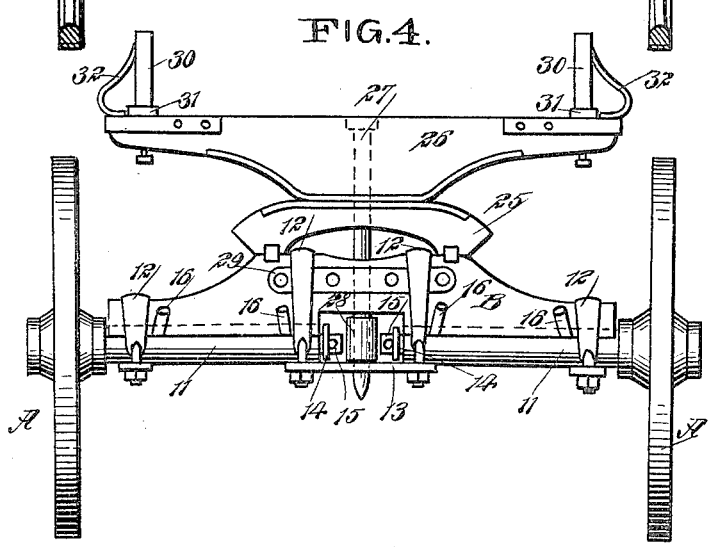
Figure 5:
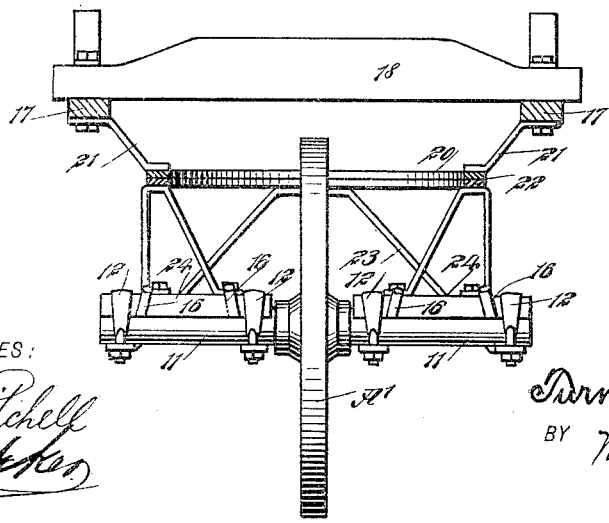

Figure 1 is a side elevation with one of the axles in section, illustrating the application of the invention to the running-gear of a three-wheeled vehicle. Fig. 2 is a plan view of the running-gear of the vehicle shown in Fig. 1. Fig. 3 is a longitudinal vertical section through the axle-bearings for the rear wheels and the rear axle-bed, the rear wheels being also in section and the section being taken on the line 3 3 of Fig. 1. Fig. 4 is a front elevation of a forward axle-bed of a four-wheeled vehicle to which the invention is applied; and Fig. 5 is a front view of the vehicle-truck of a three-wheeled vehicle, the hounds being in section and the section being on the line 5 5 of Fig. 2.

Whenever two wheels A are employed, either at the front or at the rear of a vehicle, two independent axles 10 are used, preferably of even diameter throughout, and the wheels instead of turning loosely on the axles, as customary, are secured firmly to said axles in any approved manner. The axles 10 turn in babbitt boxes 11ª or their equivalents, located at the ends of tubular casings 11, one of said casings being provided for each axle attached to a wheel. These tubular casings 11 are secured to the axle-bed B by clips 12 or their equivalents, and the central clips are usually passed through a plate 13, engaging with the bottom portion of the casings secured to the axle-bed and extending from one of said casings to the other, as shown in Figs. 3 and 4. A washer 14 is located at the inner end of each axle carried by the axle-bed, and pins 15 or their equivalents are passed through the inner ends of the said axles in engagement with the inner faces of the washers, as is also shown in Figs. 3 and 4, so that the axles cannot draw out from their bearings. The axles 10 may be lubricated at any time by placing short sections of tubes 16 in the casings 11 of the axles in such manner that lubricating material fed to the said tubes 16 will be carried to the said axles, and preferably these tubes 16, which receive a lubricating material, direct the lubricant to the boxes 11ª. When the vehicle is a three-wheeled vehicle, side reach-bars 17 are secured to the rear axle-bed, and the forward ends of said reach-bars 17 are attached in any suitable or approved manner to a forward bolster 18, as shown in Fig. 5, and the reach-bars are connected by cross-bars 19, as shown in Fig. 2. The upper section 20 of the fifth-wheel, which is used in this form of vehicle, is supported from the reach-bars 17 by brackets 21 or like devices, while the lower member 22 of said fifth-wheel is attached to a suitable frame 23, preferably of metal, as shown in Fig. 5, and this frame 23 carries two axle-beds 24, between which the single front wheel A' is located.

When a single wheel is employed, a casing 11 is provided for each axle-bed; but a single axle only is used, which extends from the outer end of one casing 11 to the outer end of the opposing casing, and the casings are secured to the axle-beds 24 by clips, as heretofore described.

When the vehicle is provided with two front wheels, a stationary arched bolster 25 is located upon the front axle-bed B and a working bolster 26 is mounted to turn on the fixed bolster 25. The working bolster is guided by a king-bolt 27, which is passed through the working bolster, through the fixed bolster, and through the forward axle-bed between the axles provided for the front wheels and through the plate 13, as shown in Fig. 4.

In order that the inner ends of the axles 10 shall not unduly wear the king-bolt 27, a roller 28 is mounted on said king-bolt between the axles, as is also shown in Fig. 4. The forward axle-bed may be strengthened, if desired, by front and rear plates 29, located near the upper central edge of the said axle-bed, since the lower central portion of the bed is necessarily cut away to receive the roller 28 on the king-bolt.

The standards 30 (illustrated in Fig. 4 as applied to the working bolster 26) are preferably tubular, and their lower ends are screwed into sockets 31, carried by the working bolster, and outer side braces 32 serve to strengthen the said standards, said braces being secured to the bolster and to the upper end portions of the standards.

Having thus described my invention, I claim as new and desire to secure by Letters Patent—

1. In a running-gear for vehicles, an axle-bed, tubular casings secured to the under side of the bed and extending nearly to the center of the same, each casing being provided with boxes at its ends, an axle mounted in each casing with its ends projecting beyond the ends of said casing, a wheel secured to the outer end of each axle, and a detachable fastening device on the inner end of each axle for securing the axles in the casing, substantially as described.

2. In a running-gear for vehicles, an axle-bed, tubular casings secured to the under side of the bed and extending to within a short distance of each other at the center of the bed, each casing being provided with boxes at its ends, axles mounted in the casings and having their ends projecting beyond the ends of said casings, wheels secured to the outer ends of the axles, washers on the inner ends of the axles, and pins passing through the axles outside of the washers, substantially as described.

3. In a running-gear for vehicles, a forward axle-bed, independent casings provided with bearing-boxes secured to the axle-bed, a shaft mounted to turn in each casing, each shaft being held from undue end movement, a king-bolt passed between the inner ends of the shafts and a loose bearing on the king-bolt with which the inner ends of the shafts may engage, as described.

4. In a running-gear for vehicles, the combination with the rear axle-bed, of reach-bars secured to the rear axle-bed, a bolster to which the forward ends of the reach-bars are secured, front axle-beds, a casing for each front axle-bed, an axle mounted in the casings and having a wheel secured to it at its center, a frame carrying the front axle-beds, and a fifth-wheel having its lower section carried by the said frame and its upper section by brackets secured to the reach-bars, substantially as described.

TURNER BYRD.

Witnesses:
HENRY JOHN KLUG,
EUGENE FAHL.